(12) United States Patent
Rovik et al.

(10) Patent No.: US 10,139,243 B2
(45) Date of Patent: Nov. 27, 2018

(54) HIGH LEVEL INSTRUCTION FOR NAVIGATIONAL ROUTING SYSTEMS

(71) Applicant: Toyota Motor Engineering & Manufacturing North America, Inc., Erlanger, KY (US)

(72) Inventors: Christopher L. Rovik, Northville, MI (US); Eric R. Schmidt, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/143,535

(22) Filed: Apr. 30, 2016

(65) Prior Publication Data
US 2017/0314949 A1   Nov. 2, 2017

(51) Int. Cl.
*G01C 21/36* (2006.01)
*G01C 21/34* (2006.01)

(52) U.S. Cl.
CPC ..... *G01C 21/3682* (2013.01); *G01C 21/3461* (2013.01); *G01C 21/3476* (2013.01);
(Continued)

(58) Field of Classification Search
CPC ............ G01C 21/3461; G01C 21/3484; G01C 21/3641; G01C 21/3682; G01C 21/3608
See application file for complete search history.

(56) References Cited

U.S. PATENT DOCUMENTS 5,031,104 A * 7/1991 Ikeda ................. G01C 21/3682
340/990
5,220,507 A * 6/1993 Kirson ................... G01C 21/34
340/995.19
(Continued)

FOREIGN PATENT DOCUMENTS

EP         1544576 A1 *  6/2005   ......... G01C 21/3697
JP     2008139208 A  *  6/2008
(Continued)

OTHER PUBLICATIONS

Rand McNally, "Advanced GPS, Road Explorer 50 & 60 User Manual", Mar. 2015, © 2015 Rand McNally. © 2015 HERE. All rights reserved, 56 pages (51 numbered pages).*
(Continued)

*Primary Examiner* — Behrang Badii
*Assistant Examiner* — David A Testardi
(74) *Attorney, Agent, or Firm* — Christopher G. Darrow; Darrow Mustafa PC

(57) ABSTRACT

A navigation system (NAV system) may provide a variety of information and may be integrated with a variety of on-board vehicle systems or features. The NAV system may provide various route guidance options between a present location and a desired destination. The route guidance options may be based on a high level of user preferences. The high level of user preferences may be selected by the user in advance or at the time of requesting route guidance. The NAV system may provide various route options based on key geographical features along the route. The NAV system may provide various route options based on personal points of interest. The NAV system may provide various route options based on a user's route habits or frequency.

16 Claims, 4 Drawing Sheets

(52) U.S. Cl.
CPC ..... *G01C 21/3484* (2013.01); *G01C 21/3641* (2013.01); *G01C 21/3667* (2013.01)

(56) References Cited

U.S. PATENT DOCUMENTS

| | | | | |
|---|---|---|---|---|
| 5,796,613 | A * | 8/1998 | Kato | G01C 21/28 342/457 |
| 6,356,836 | B1 * | 3/2002 | Adolph | G01C 21/26 701/410 |
| 6,401,034 | B1 * | 6/2002 | Kaplan | G01C 21/3476 340/988 |
| 6,438,489 | B1 * | 8/2002 | Greif | G01C 21/32 701/410 |
| 6,587,782 | B1 * | 7/2003 | Nocek | G01C 21/3614 701/438 |
| 6,598,018 | B1 | 7/2003 | Junqua | |
| 7,133,771 | B1 * | 11/2006 | Nesbitt | G01C 21/3453 340/995.19 |
| 7,321,823 | B2 * | 1/2008 | Brulle-Drews | G01C 21/3629 340/988 |
| 7,463,976 | B2 * | 12/2008 | Nomura | G01C 21/3461 340/995.27 |
| 7,693,720 | B2 * | 4/2010 | Kennewick | G06F 17/30654 704/257 |
| 7,702,456 | B2 * | 4/2010 | Singh | G01C 21/3641 340/995.1 |
| 8,719,026 | B2 * | 5/2014 | Kennewick | G06Q 30/0261 704/255 |
| 9,146,129 | B1 * | 9/2015 | Furio | G01C 21/3682 |
| 9,506,769 | B2 * | 11/2016 | Healey | G01C 21/3484 |
| 9,541,412 | B1 * | 1/2017 | Botea | G01C 21/343 |
| 9,620,113 | B2 * | 4/2017 | Kennewick | G10L 15/22 |
| 2003/0225508 | A9 * | 12/2003 | Petzold | G01C 21/3453 701/533 |
| 2004/0204828 | A1 * | 10/2004 | Ebi | G01C 21/3608 701/431 |
| 2005/0192742 | A1 * | 9/2005 | Okochi | G01C 21/3484 701/424 |
| 2006/0122770 | A1 * | 6/2006 | Sasano | G01C 21/3476 701/438 |
| 2006/0241854 | A1 * | 10/2006 | Tu | G01C 21/3446 701/416 |
| 2006/0287815 | A1 * | 12/2006 | Gluck | G01C 21/3632 701/436 |
| 2007/0156333 | A1 * | 7/2007 | McBride | G01C 21/20 701/423 |
| 2007/0219706 | A1 * | 9/2007 | Sheynblat | G01C 21/3679 701/532 |
| 2008/0167803 | A1 * | 7/2008 | Gretton | G01C 21/3655 701/533 |
| 2010/0036599 | A1 * | 2/2010 | Froeberg | G01C 21/3461 701/532 |
| 2010/0094534 | A1 * | 4/2010 | Naick | G01C 21/3484 701/532 |
| 2010/0145700 | A1 * | 6/2010 | Kennewick | G06F 17/30654 704/257 |
| 2010/0211304 | A1 | 8/2010 | Hwang et al. | |
| 2010/0312466 | A1 * | 12/2010 | Katzer | G01C 21/3492 701/533 |
| 2011/0106429 | A1 * | 5/2011 | Poppen | G01C 21/3476 701/533 |
| 2011/0172903 | A1 * | 7/2011 | Farr | G01C 21/3461 701/533 |
| 2012/0232787 | A1 * | 9/2012 | Kunath | G01C 21/3461 701/423 |
| 2013/0103313 | A1 * | 4/2013 | Moore | G01C 21/20 701/533 |
| 2013/0166196 | A1 * | 6/2013 | Narasimha | G01C 21/3682 701/426 |
| 2013/0253834 | A1 * | 9/2013 | Slusar | G01C 21/3608 701/540 |
| 2014/0058672 | A1 * | 2/2014 | Wansley | G01C 21/3484 701/533 |
| 2014/0136109 | A1 * | 5/2014 | Sumiyoshi | G01C 21/3608 701/539 |
| 2014/0236462 | A1 * | 8/2014 | Healey | G08G 1/0962 701/117 |
| 2015/0233727 | A1 * | 8/2015 | Roelle | G01C 21/3667 701/533 |
| 2015/0255064 | A1 * | 9/2015 | Fujii | G06F 17/2755 704/257 |
| 2015/0285652 | A1 * | 10/2015 | Peri | G01C 21/3476 701/438 |
| 2015/0377640 | A1 * | 12/2015 | Healey | G01C 21/3484 701/538 |
| 2016/0003637 | A1 | 1/2016 | Andersen | |
| 2016/0223355 | A1 * | 8/2016 | Habib | G01C 21/3492 |
| 2016/0273936 | A1 * | 9/2016 | Gearhart | G01C 21/3679 |
| 2017/0067750 | A1 * | 3/2017 | Day | G01C 21/3461 |

FOREIGN PATENT DOCUMENTS

| | | | | |
|---|---|---|---|---|
| JP | | 2010008070 A * | 1/2010 | |
| WO | WO 2009023219 A1 * | 2/2009 | ......... G01C 21/3461 | |

OTHER PUBLICATIONS

Rand McNally, "Truck GPS TND 730 & 530 LM (IntelliRoute) User Manual", © 2014 Rand McNally. All rights reserved, 64 pages (59 numbered pages).*
EPO machine translation of EP 1544576 (original EP document published Jun. 22, 2005) (Year: 2005).*
Google Maps, "Save directions on My Maps", Retrieved from the Internet: <https://support.google.com/mymaps/answer/3502610?hl=en >, Retrieved Jan. 20, 2016, 2 pages.

* cited by examiner

HIGH LEVEL INSTRUCTION FOR NAVIGATIONAL ROUTING SYSTEMS

FIELD

The subject matter described herein relates in general to in-vehicle navigation systems and, more particularly, to operation of in-vehicle navigation systems using high level instructions.

BACKGROUND

Modern vehicles commonly have an in-vehicle navigation system (NAV system). The NAV system may provide route guidance and position information about the vehicle. The NAV system uses a display screen to communicate information visually and a speaker to communicate information audibly. The NAV system can provide a variety of information and may be integrated with a variety of on-board vehicle systems or features. For example, the NAV system may be integrated with the music system (radio, satellite radio, cd player, dvd player, etc), the on-board telephone phone system, climate control system, comfort and convenience system, etc.

The route guidance provided is based on an inputted destination and a starting location. The NAV system may provide the user with a single route option or multiple route options. The multiple route options are based various limited options. For example, the NAV system may provide route options based on a shortest length, a shortest time, and a most fuel efficient (eco factors). These options, however, are limited and may not meet the user's needs and/or desires.

SUMMARY

A navigation system (NAV system) may provide a variety of information and may be integrated with a variety of on-board vehicle systems or features. The NAV system may provide various route guidance options between a present location and a desired destination. The route guidance options may be based on a high level of user preferences. The high level of user preferences may be selected by the user in advance or at the time of requesting route guidance. The NAV system may provide various route options based on key geographical features along the route. The NAV system may provide various route options based on personal points of interest. The NAV system may provide various route options based on a user's route habits or frequency.

In one respect, the present disclosure is directed to a navigation system having a display and a route guidance system. The NAV system is operable to display visual information. The route guidance system is operable to provide route guidance between a current position and a desired destination. The route guidance system provides multiple route options between the current position and the desired destination based on user preferences. The multiple route options being characteristic of the user preferences. The user preferences include at least one of an avoid bridges option, an avoid tunnels option, an avoid mountain passes option, an avoid deserts option, an allow international crossings option, an allow usual route option, and a show personal points of interest (POI) option.

In another respect, the present disclosure is directed to a method of providing route guidance. The method includes: (1) displaying visual information on a display; (2) entering a destination; (3) selecting at least one route guidance user preference; (4) ascertaining multiple routes between a current location and the destination, at least one of the routes being based on the selected user preference; (5) providing a user with the multiple routes; (6) selecting one of the provide routes; and (7) providing route guidance based on the selected route. The selected at least one user preference includes at least one of an avoid bridges option, an avoid tunnels option, an avoid mountain passes option, an avoid deserts option, an allow international crossings option, an allow usual route option, and a show personal points of interest (POI) option.

DETAILED DESCRIPTION

Figure 1:
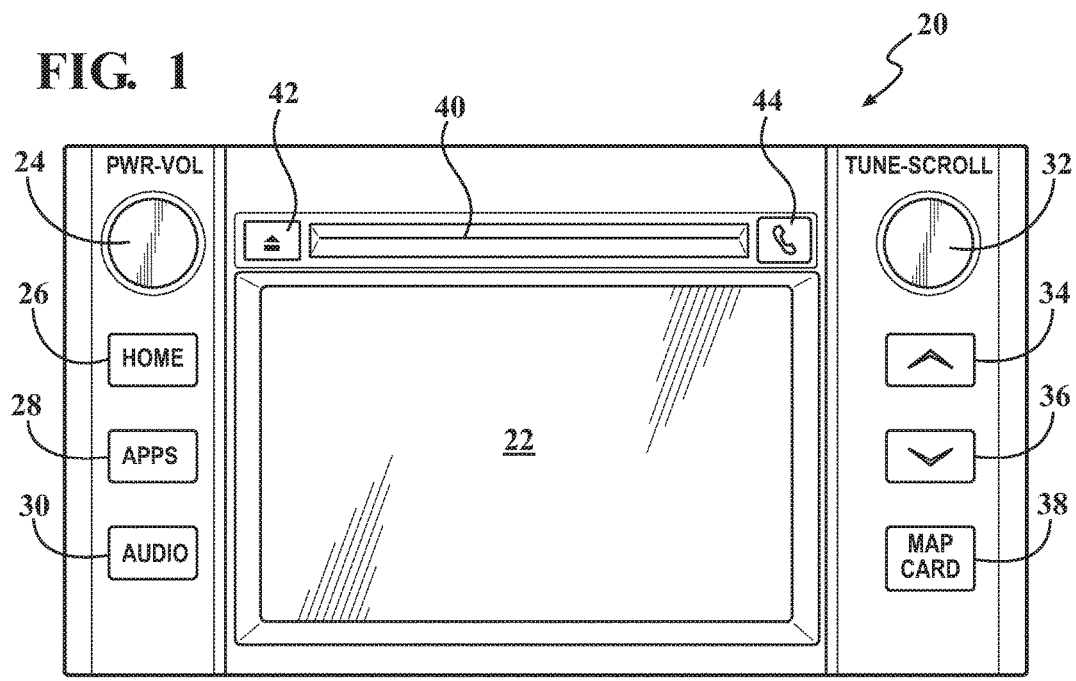
FIG. 1 is an example on-board vehicle navigation system interface and display.

This detailed description relates to navigation systems (NAV systems). The NAV system may be an on-board system or a mobile system, such as a smart phone or other portable device. The NAV system may provide a variety of information and may be integrated with a variety of on-board vehicle systems or features, such the music system (radio, satellite radio, cd player, dvd player, etc), the on-board telephone phone system, climate control system, comfort and convenience system, etc. The NAV system may have the display set to show information about a single system in a full screen mode or have the display divided to show information about multiple systems simultaneously (mixed display mode). The NAV system may provide various route guidance options between a present location and a desired destination. The route guidance options may be based on a high level of user preferences. The high level of user preferences may be selected by the user in advance or at the time of requesting route guidance. The NAV system may provide various route options based on key geographical features along the route. The NAV system may provide various route options based on personal points of interest. The NAV system may provide various route options based on a user's route habits or frequency.

Detailed embodiments are disclosed herein, however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an on-board vehicle NAV system 20 is shown. NAV system 20 includes a display screen 22 along with various interface controls. The interface controls, by way of example, may include a power/volume control 24, a home button 26, an apps button 28, an audio button 30, a tune/scroll control 32, an up selector 34, a down selector 36, a map/card selector 38, a disc slot 40, a disc eject selector 42 and a phone selector 44. The interface controls may be utilized to allow access and control over the various systems/functions controlled by NAV system 20. The various systems or functions may include route navigation, music, telephone, comfort, and convenience by way of example. The various systems or functions may each have various display configurations.

Figure 2:
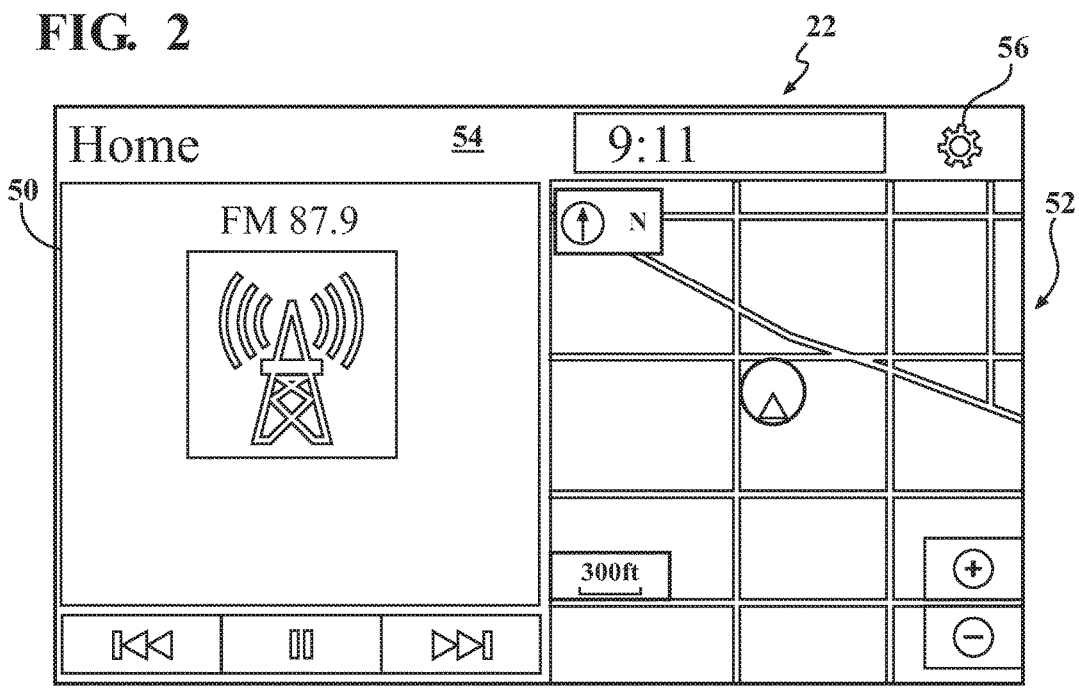
FIG. 2 is an example of a split screen display mode for the navigation system display of FIG. 1.
Figure 3:
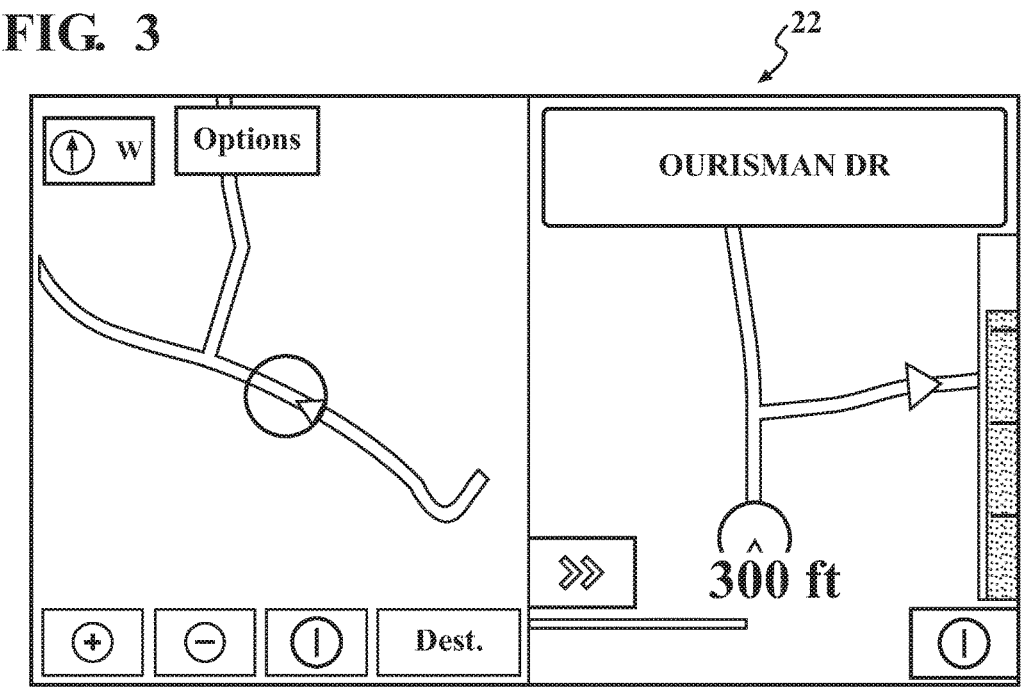
FIG. 3 is an exemplary view of a full screen mode showing route guidance.

In one or more arrangements, NAV system 20 may have multiple display modes. In some display modes, a single system or function utilizes the entire display 22 (full screen mode). For example, as illustrated in FIG. 3, a full screen mode for the navigation feature is illustrated. In this mode, the entire area of display 22 may be used to convey operational information related to the navigation feature. In some display modes, multiple systems or functions each use a portion of display 22 (mixed display mode). For example, as illustrated in FIG. 2, display 22 may be separated into two major display areas—a first display area 50 and a second display area 52. In this example, operational information related to the music system, more particularly the radio system, is displayed in first display area 50 while operational information related to the navigation feature is displayed in second display area 52. Display 22 may also include a header display area 54 which may be used to display a limited amount of additional information that may be generic or un-related to the system being displayed in first or second display areas 50, 52. Header display area 54 is significantly smaller in display size than first and second display areas 50, 52 and utilizes only a minor portion of display 22 in order to display the additional information. Display 22 may be a touch sensitive screen such that a user touching display 22 activates a function associated with the image/information being displayed. For example, touching HOME area may result in NAV system 20 returning a default display condition associated with a root level of interface while touching setting button 56 may result in NAV system 20 changing to a setting display that allows the user to adjust the settings of NAV system 20. It should be appreciated that while header display area 54 is illustrated as being position on the top portion of display area 22, it could be positioned only the bottom portion of display area 22. Moreover, in one or more arrangements a header display area 54 may be present in a full screen mode wherein the header display area 54 is again significantly smaller than the main display area communicating information associated with the feature using the full screen mode.

Figure 4:
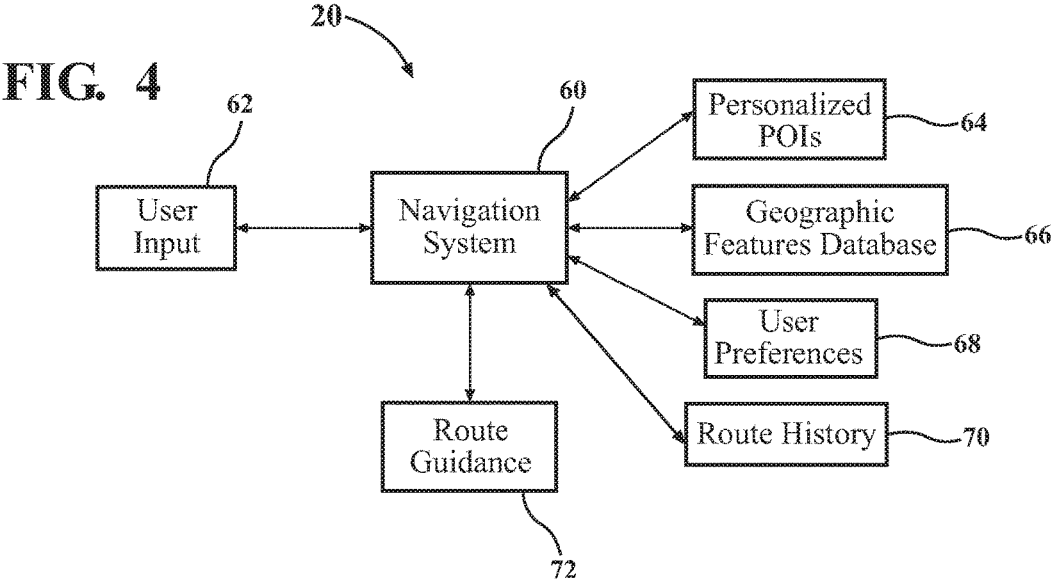
FIG. 4 is a schematic representation of an exemplary navigation system

In one or more arrangements, NAV system 20, as illustrated in FIG. 4, may use various modules to interact with the user and provide desired route guidance. NAV system 20 may include a main module 60 that receives input from a user via a user input module 62. Input module 62 allows a user to communicate with main module 60 to achieve the desired functionality. Input module 62 may allow a user to communicate with main module 60 via a physical input, such as by touching display screen 22 and the various buttons, and/or a verbal input via a microphone (not shown). NAV system 20 may also include a personalized point of interest (POI) module 64, a geographic features database module 66, a user preferences module 68, a route history module 70 and/or a route guidance module 72, by way of example. Route guidance module 72 may provide route guidance instructions and commands and/or ascertain route options using one or more of the other modules. Each of these modules may be integrated within NAV system 20 or may be remote therefrom and communicate with NAV system 20 through means well known in the art, such as wi-fi, cellular networks, satellite communications, etc. by way of non-limiting example. Each of the modules may interact, as needed, with main module 60 to provide the desired functionality, as described below.

Figure 5:
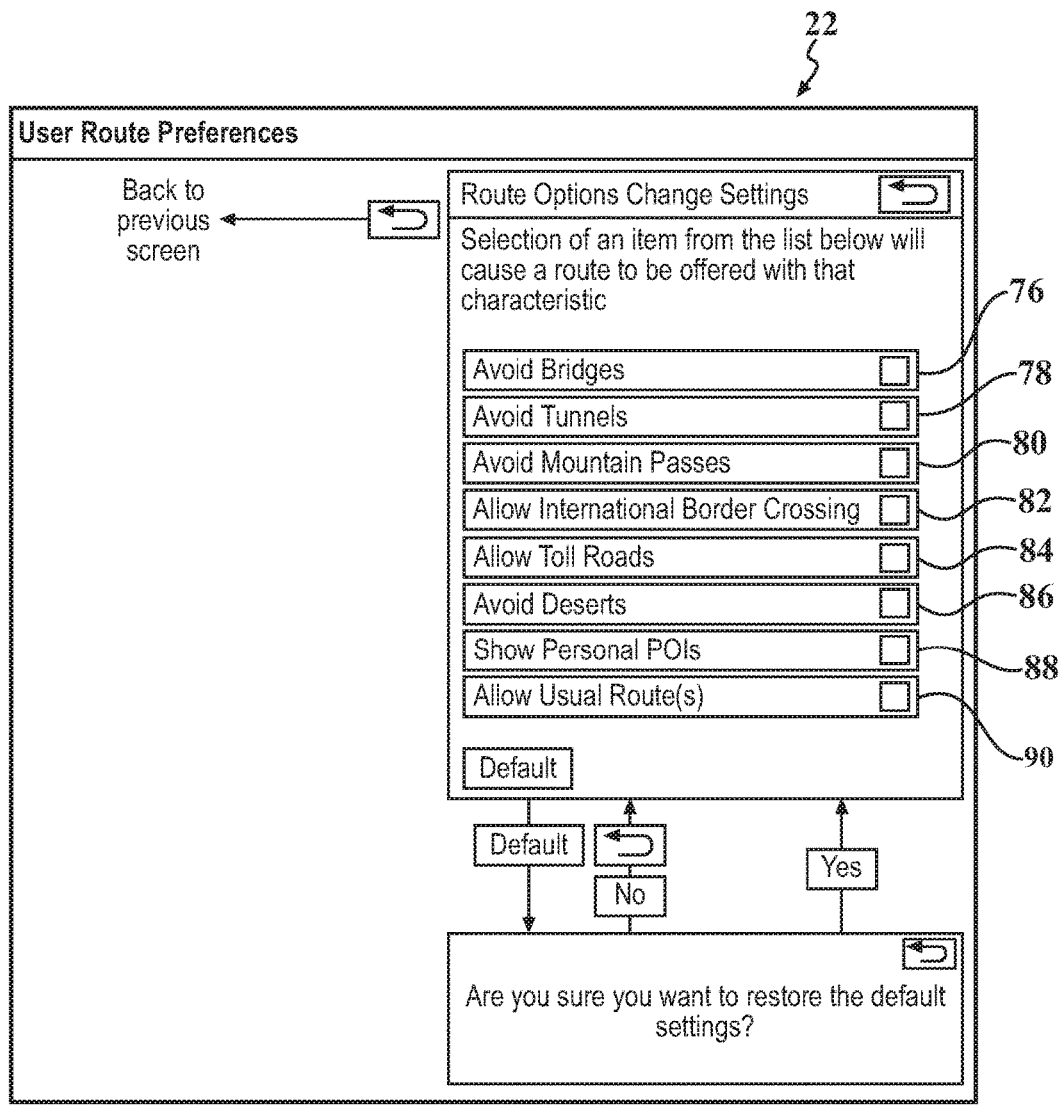
FIG. 5 is an exemplary user interface allowing selection of customized route options.

In one or more arrangements, NAV system 20 may use user preference module 68 to provide route guidance options to the user based on the preferences. The user preferences may be based on higher level of preferences than provided in prior art systems. For example, as shown in FIG. 5, NAV system 20 may allow a user to select various options that will cause a route to be offered with those particular characteristics. The high level options may include: (1) an avoid bridges option 76; (2) an avoid tunnels option 78; (3) an avoid mountain passes option 80; (4) an allow international border crossings options 82; (4) an allow toll roads option 84; (5) an avoid deserts options 86; (6) a show personal POIs option 88; and/or (7) an allow usual route(s) option 90. The user may select the individual options shown to enable NAV system 20 to display route options that correspond with the characteristics of the option selected. The route options provided by NAV system 20 may list the relevant characteristic(s) associated with each of the present route options to enable the user to select a desired route based on those characteristics. The various user preferences selected may be stored in user preferences module 68 and accessed by main module 60.

In one or more arrangements, selecting the avoid bridges option 76 may result in NAV system 20 providing at least one route guidance option that avoids bridges, if possible, while, optionally, displaying route options that do include bridges. In one or more arrangements, the route options may list the number of bridges along each particular route to enable the user to select a desired route. The bridges along a particular route may be contained in the geographic features database module 66 and accessed by main module 60.

In one or more arrangements, selecting the avoid tunnels option 78 may result in NAV system 20 providing at least one route guidance option that avoids tunnels, if possible, while, optionally, displaying route options that do include tunnels. In one or more arrangements, the route options may list the number of tunnels along each particular route to enable the user to select a desired route. The tunnels along a particular route may be contained in the geographic features database module 66 and accessed by main module 60.

In one or more arrangements, selecting the avoid mountain passes option 80 may result in NAV system 20 providing at least one route guidance option that avoids mountain passes, if possible, while, optionally, displaying route options that do include mountain passes. In one or more arrangements, the route options may list the number of mountain passes along each particular route to enable the user to select a desired route. The mountain passes along a particular route may be contained in the geographic features database module 66 and accessed by main module 60.

In one or more arrangements, selecting the avoid deserts option 86 may result in NAV system 20 providing at least one route guidance option that avoids deserts, if possible, while, optionally, displaying route options that do include deserts. In one or more arrangements, the route options may list the number of deserts along each particular route to enable the user to select a desired route. The deserts along a particular route may be contained in the geographic features database module 66 and accessed by main module 60.

In one or more arrangements, selecting the allow toll roads options 84 may result in NAV system 20 providing at least one route guidance option that includes toll roads, if possible, while, optionally, displaying route options that do not include toll roads. Optionally, the providing of a toll road route option, may not be displayed/provided if the route is significantly longer (time and/or distance) from non-toll road options by a predetermined value, such as a percentage of the shortest option by way of example. Optionally, NAV system 20 may also provide the user with an estimate of the tolls that would be incurred in the toll route options offered. The toll amount may be contained in the geographic features database module 66 and accessed by main module 60.

In one or more arrangements, selecting the allow international border crossing option 82 may result in NAV system 20 providing at least one route guidance option that includes an international border crossing, if possible, while, optionally, displaying route options that do not include an international border crossing. For example, if a user desires to travel from Detroit, Mich. to New York, N.Y., NAV system 20 may provide a route that stays within the United States and a route that goes through Canada. Optionally, the providing of an international border crossing option may not be displayed/provided if the route is significantly longer (time and/or distance) than non-international border crossing options by a predetermined value, such as a percentage of the shortest option by way of example. Optionally, NAV system 20 may also provide the user with a listing of documents needed or other special considerations associated with the provided international border crossing. For example, if the user selects the route option that includes an international border crossing, NAV system 20 may ask the user if they have certain documents required for the crossing, such as a passport, an enhanced driver's license, health documents for pets in the vehicle, and/or permission allowing minors to cross the border, etc. NAV system 20 may also provide an estimate of the cost that would be incurred in the border crossing. The international border crossings, special considerations and costs associated with the particular international border crossings may be contained in geographic features database module 66 and accessed by main module 60.

In one or more arrangements, selecting the allow personal POIs option 88 may result in NAV system 20 providing at least one route guidance option that includes a personal POI, if possible, while, optionally, displaying route options that do not include a personal POI. Optionally, the providing of a personal POI option may not be displayed/provided if the route is significantly longer (time and/or distance) than non-personal POI options by a predetermined value, such as a percentage of the shortest option by way of example. In that manner, only personal POIs that are near the more direct route options will be displayed. For example, a user's personal POI may be their grandmother's house. When NAV system 20 is computing possible routes and their grandmother's house is near one of the routes NAV system 20 may provide a route option that takes the user past their grandmother's house, like a way point. The personal POIs in personalized POIs module 64 may be entered by the user or suggested by NAV system 20. For example, if the same destination is entered a certain number of times, NAV system 20 may ask the user if they would like to set that destination as a personal POI. The personal POIs may be contained in personalized POIs module 64 and accessed by main module 60.

In one or more arrangements, selecting the allow usual route options 90 may result in NAV system 20 providing route guidance options that include various usual ways to get to the destination. For example, the user may take few different routes between home and work. These different routes may be stored in route history module 70 and accessed by NAV system 20. When route history module 70 contains multiple previously traveled routes between an entered destination and a starting point NAV system 20 will present the user with these various route options (usual routes taken by the user in the past between the two locations). In this manner, NAV system 20 may provide the user with options corresponding to the usual way a user travels between two locations and allow the user to easily select the desired route for that trip. The usual routes may be suggested by NAV system 20 based on previous travel patterns or may be entered by the user. For example, if the user has traveled a particular route between two locations a predetermined number of times then that route may be classified as a usual route by NAV system 20. As another example, a user may request that a route traveled be classified as a usual route and, optionally, may be given a user specified name for the route, such as "the back way home" by way of example, that will be displayed by NAV system 20 as a possible route option. The usual routes may be contained in route history module 70 and accessed by main module 60.

Figure 6:
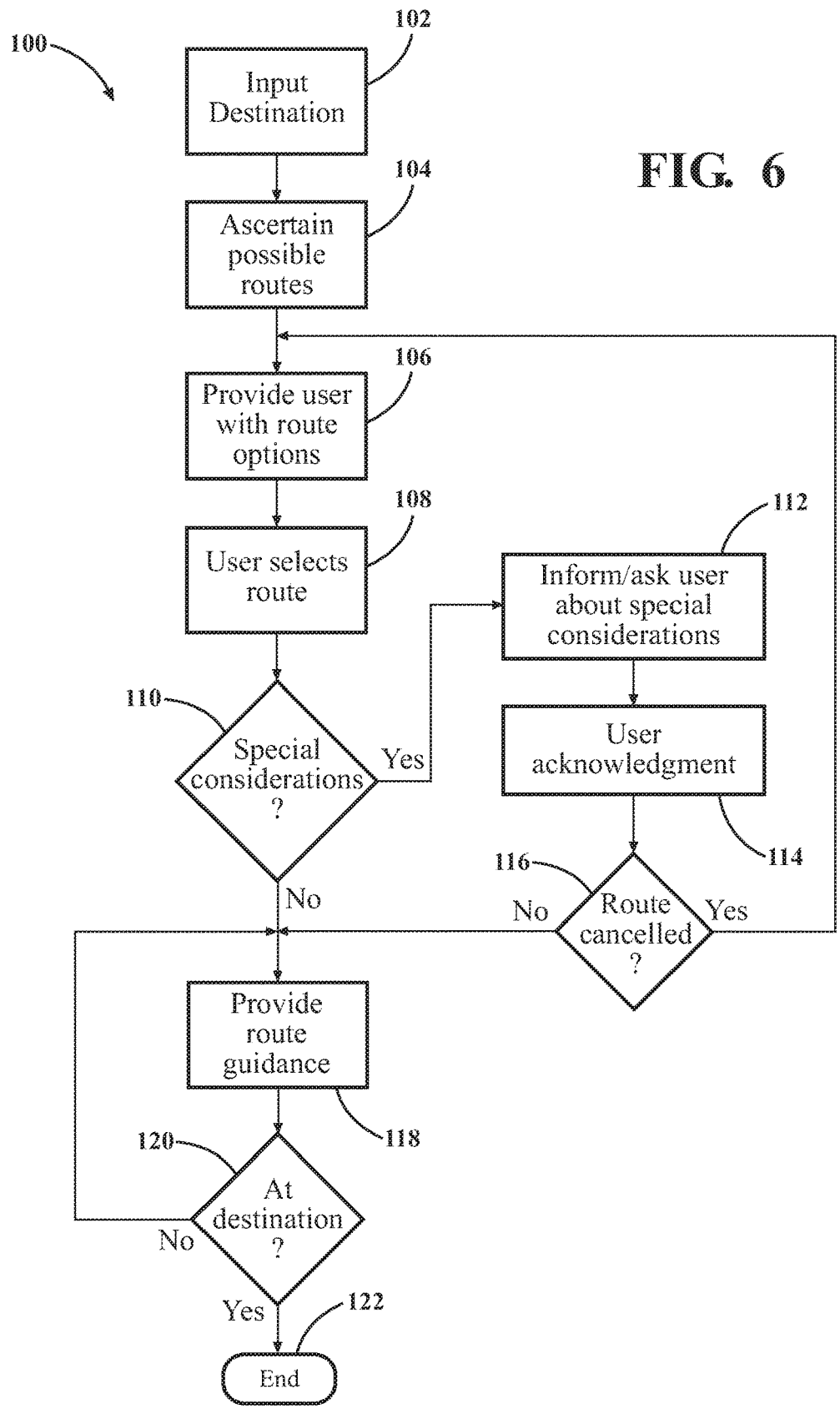
FIG. 6 is a flow chart illustrating an exemplary control scenario for providing route guidance.

In one or more arrangements, NAV system 20 may use the exemplary control scenario 100 shown in FIG. 6. Control scenario 100 begins when a user inputs a desired destination, as indicated in block 102. The input may be made verbally by the user or entered into NAV system 20 via touching display screen 22 or the various buttons on NAV system 20. NAV system 20 then ascertains possible routes as indicated in block 104. NAV system 20 may ascertain possible routes using traditional route determinations and also using the user preferences stored in user preferences module 68. Depending on the stored user preferences, NAV system 20 will also access and use personalized POI module 64, geographic features database module 66, and/or route history module 70 to ascertain possible routes, as discussed above. In one or more arrangements, a user may verbally request a user preference (regardless of its value in user preferences module 68) when verbally requesting route guidance to a particular destination. In this case, NAV system 20 will take into consideration of the requested preference when ascertaining possible routes. For example, a user may verbally request a route to work the "back way" or avoiding bridges. NAV system 20 will then ascertain possible routes that correspond to the "back way" or that avoid bridges.

With the possible routes ascertained, NAV system 20 provides the user with the various route options, as indicated in block 106. The displayed route options include the characteristics associated with that particular route (i.e., the "back way", avoid bridges, etc.). The user may then select the desired route, as indicated in block 108. Once the route is selected, NAV system 20 determines if there are any special considerations associated with that route, as indicated in decision block 110. Special considerations, as discussed above, may include information about required documents, in the case of an international border crossing, and costs associated with a particular route. If there are special considerations associated with the selected route, NAV system 20 informs the user of the special considerations, as indicated in block 112. The user acknowledges the special considerations, as indicated in block 114, and is given the option of proceeding with the route or cancelling the route. For example, if the user does not have the needed documents or does not want to incur the associated cost, the user may want to cancel the selected route. NAV system 20 determines if the user cancelled the route at decision block 116. If the user cancelled the selected route, control scenario 100 returns to block 106 and presents the user with the previously presented route options.

If it is determined at decision block 116 that the selected route has not been cancelled or if it was determined at decision block 110 that there are not any special considerations, NAV system 20 provides route guidance, as indicated in block 118. When providing route guidance, NAV system 20 may provide dynamic information, such as traffic information, and may provide new route options based on that dynamic information, as known in the art. NAV system 20 monitors the progress to the destination, as indicated in decision block 120, and continues to provide route guidance until the destination has been reached. Once the destination has been reached, control scenario 100 ends, as indicated in block 122.

It will be appreciated that arrangements described herein can provide numerous benefits, including one or more of the benefits mentioned herein. NAV system 20 may provide various route guidance options between a present location and a desired destination. The route guidance options may be based on a high level of user preferences, such as geographic features, personalized POIs, and usual routes taken. The high level of user preferences may be selected by the user in advance or at the time of requesting route guidance. It should be appreciated that while NAV system 20 has been shown and described as being an on-board system, in one or more arrangements NAV system 20 may be a portable system, such as a smart phone or other portable device with the included functionality.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. 112, sixth paragraph, unless and until such claim limitations expressly use the phrase "means for" followed by a statement of function void of further structure.

What is claimed is:

1. A navigation system comprising:
   a display operable to display visual information;
   a user input module in operative communication with the display, the user input module being configured to receive a request from a user for route guidance from a location to a destination and to enable a user to select at least one user preference, the user input module being configured to enable user selection of a show personal points of interest option as the at least one user preference;
   a personalized point of interest module in operative communication with the user input module and including information relating to one or more personalized points of interest;
   a route guidance module in operative communication with the personalized point of interest module and the user input module, the route guidance module being configured to determine one or more route options between the location and the destination,
   wherein the navigation system is configured to, responsive to selection by a user of the show personal points of interest option, and for at least one route option determined between the location and the destination, display as a route option for selection by a user an alternative route option including a personalized point of interest as a waypoint between the location and the destination, when a time required to travel between the location and the destination using the alternative route option does not exceed a time required to travel between the location and the destination using the at least one route option by more than a predetermined percentage of an estimated shortest time required to travel between the location and the destination as determined in the navigation system.

2. The navigation system of claim 1, wherein the at least one user preference includes an allow usual route option and the route guidance system provides at least one route option that the user has traveled before.

3. The navigation system of claim 2, further comprising a route history module having multiple previously traveled routes between the current position and the destination and wherein the route history module provides multiple route options to travel between the current position and destination, each route option being a previously traveled route.

4. The navigation system of claim 1, wherein the at least one user preference includes an allow international border crossing option and wherein the route guidance system provides at least one route option that includes an international border crossing and at least one route option that does not include an international border crossing, and wherein when a route is selected that includes an international border crossing, a user is advised by the navigation system of requirements for the border crossing.

5. The navigation system of claim 1, wherein the at least one user preference includes an avoid bridges option and the route guidance system provides at least one route option that avoids traveling over bridges.

6. The navigation system of claim 1, wherein the at least one user preference includes an avoid tunnels option and the route guidance system provides at least one route option that avoids traveling through tunnels.

7. The navigation system of claim 1, wherein the at least one user preference includes an avoid mountain passes option and the route guidance system provides at least one route option that avoids traveling through a mountain pass.

8. The navigation system of claim 1, wherein the at least one user preference includes an avoid deserts option and the route guidance system provides at least one route option that avoids traveling through a desert.

9. A method of providing route guidance, the method comprising:
   in a main module of a navigation system, receiving a request from a user for route guidance from a location to a destination, the request including selection of at least one user preference including a show personal points of interest option;
   in a route guidance module of the navigation system in operative communication with the main module and configured to determine route options between a location and a destination, determining at least one route option between the location and the destination;
   retrieving, in the main module, from a personalized point of interest (POI) module of the navigation system in operative communication with the main module and including location data for user-associated personal points of interest, location data relating to each personal point of interest residing within a predetermined distance of any location on any of the route options between the location and the destination determined by the route guidance module;
   determining, in the route guidance module, and using the retrieved location data relating to personal points of interest, at least one alternative route option including at least one personalized point of interest as a waypoint between the location and the destination;
   determining a time required to travel between the location and the destination using the at least one route option between the location and the destination;
   determining a time required to travel between the location and the destination using the at least one alternative route option;
   determining whether a time required to travel between the location and the destination using the at least one alternative route option exceeds a time required to travel between the location and the destination using the at least one route option by more than a predetermined percentage of an estimated shortest time required to travel between the location and the destination as determined in the navigation system; and in response to the time required to travel between the location and the destination using the at least one alternative route option not exceeding the time required to travel between the location and the destination using the at least one route option by more than a predetermined percentage of an estimated shortest time required to travel between the location and the destination as determined in the navigation system, displaying as a route option for selection by a user the at least one alternative route option.

10. The method of claim 9, wherein the at least one user preference includes an allow usual route option, and wherein the at least one route option between the location and the destination includes at least one route option that the user has traveled before.

11. The method of claim 10, further comprising providing multiple routes that the user has traveled before between the location and the destination.

12. The method of claim 9, wherein when the at least one user preference includes an allow international border crossing option, the at least one route option between the location and the destination includes at least one route option that crosses an international border and at least one route option that does not cross an international border, and wherein when a selected route includes an international border crossing a user is advised of requirements for the border crossing.

13. The method of claim 9, wherein the at least one user preference includes an avoid bridges option, and the at least one route option between the location and the destination includes at least one route option that avoids traveling over bridges.

14. The method of claim 9, wherein the at least one user preference includes an avoid tunnels option, and wherein the at least one route option between the location and the destination includes at least one route option that avoids traveling through tunnels.

15. The method of claim 9, wherein the at least one user preference includes an avoid mountain passes option, and wherein the at least one route option between the location and the destination includes at least one route option that avoids traveling through a mountain pass.

16. A navigation system comprising:
   a display operable to display visual information;
   a user input module in operative communication with the display, the user input module being configured to receive a request from a user for route guidance from a location to a destination and to enable a user to select at least one user preference, the user input module being configured to enable user selection of a show personal points of interest option as the at least one user preference;
   a personalized point of interest module in operative communication with the user input module and including information relating to one or more personalized points of interest;
   a route guidance module in operative communication with the personalized point of interest module and the user input module, the route guidance module being configured to determine one or more route options between the location and the destination,
   wherein the navigation system is configured to, responsive to selection by a user of the show personal points of interest option, and for at least one route option determined between the location and the destination, display as a route option for possible selection by a user an alternative route option including a personalized point of interest as a waypoint between the location and the destination, when a travel distance between the location and the destination using the alternative route option does not exceed a travel distance between the location and the destination using the at least one route option by more than a predetermined percentage of an estimated shortest travel distance between the location and the destination as determined in the navigation system.

\* \* \* \* \*